United States Patent
Episale et al.

(10) Patent No.: US 7,493,350 B2
(45) Date of Patent: Feb. 17, 2009

(54) ENTITY BASED CONFIGURABLE DATA MANAGEMENT SYSTEM AND METHOD

(75) Inventors: James D. Episale, Binghamton, NY (US); Glenn C. Godoy, Endwell, NY (US); Nitin Jhingan, Endwell, NY (US)

(73) Assignee: International Business Machines Corporation, Armonk, NY (US)

(*) Notice: Subject to any disclaimer, the term of this patent is extended or adjusted under 35 U.S.C. 154(b) by 395 days.

(21) Appl. No.: 10/973,702

(22) Filed: Oct. 25, 2004

(65) Prior Publication Data

US 2006/0101095 A1    May 11, 2006

(51) Int. Cl.
G06F 12/00 (2006.01)
G06F 17/30 (2006.01)
G06F 11/16 (2006.01)

(52) U.S. Cl. .......................... 707/204; 711/162; 714/5
(58) Field of Classification Search .................. None
See application file for complete search history.

(56) References Cited

U.S. PATENT DOCUMENTS

| | | | |
|---|---|---|---|
| 5,630,127 A | 5/1997 | Moore et al. | |
| 5,721,913 A | 2/1998 | Ackroff et al. | |
| 6,490,597 B1 | 12/2002 | Singh et al. | |
| 6,708,188 B1 * | 3/2004 | Bear et al. | 707/202 |
| 2002/0073396 A1 * | 6/2002 | Crupi et al. | 717/104 |
| 2005/0149584 A1 | 7/2005 | Bourbonnais et al. | |

FOREIGN PATENT DOCUMENTS

| WO | WO 02/082321 A | 10/2002 |
|---|---|---|
| WO | 2004088664 A2 | 10/2004 |
| WO | WO 2004/088664 A | 10/2004 |

OTHER PUBLICATIONS

Batra et al., "Policy Driven Data Administration", 2002, Proceedings. Third International Workshop on.*
Deitel et al., "How to Program C++," 2001, Prentice Hall, Third Edition, 91 and 192.*
Moores TT, "Developing a Software Size Model for Rule-Based Systems: A Case Study", Expert Systems with Applications, vol. 21, No. 4, pp. 229-237, Nov. 2001.

(Continued)

*Primary Examiner*—Kuen S Lu
*Assistant Examiner*—Aleksandr Kerzhner
(74) *Attorney, Agent, or Firm*—William E. Schiesser; Greenblum Bernstein P.L.C.

(57) ABSTRACT

A method and system is provided for configurable articulation of criteria for period archival, deletion, or movement of data from one data storage system to another. A consistent method for executing programs which manage specific data uses criteria articulated to identify sets of data and the rules associated with the data entities being process by the programs. Data entities may have different controlling rules and policies such as required by different countries, companies, or contractual arrangements. Data entities are associated with rules and policies that define durations for storage, frequency of archival, retention periods, or the like. As a result a consistent process may be achieved that captures an organization's retention policy and that be administered over a variety of application systems.

16 Claims, 9 Drawing Sheets

OTHER PUBLICATIONS

M. Leszak, et al., "Integration of Structured Methods for Requirements Specification of Information Systems", Requirements Engineering '91 Proceedings, pp. 139-159, Published: Berlin, Germany, 1991, viii+208.

G. Wiederhold, "Objects and Domains for Managing Medical Data and Knowledge", Methods of Information in Medicine, vol. 34, No. 1-2, pp. 40-46, Mar. 1995.

C.F. Eick, et al., "DALI-a Knowledge Base Management System", Proceedings. The First International Conference on Industrial and Engineering Applications of Artificial Intelligence and Expert Systems IEA/AIE—88, pp. 837-846, vol. 2, 1998.

Kampffmeyer, U: "Architecture of Documents Management and Electronic Archive System" vol. 47, No. 2, 1996, pp. 75-80, English summary only.

Stefani, H: "Data Archiving with SAP" May 2002, pp. 1-3, 35.

* cited by examiner

ENTITY BASED CONFIGURABLE DATA MANAGEMENT SYSTEM AND METHOD

FIELD OF THE INVENTION

The invention generally relates to a system and method for archiving data and, more particularly, to a system and method of archiving data based on highly configurable data retention policies.

BACKGROUND OF THE INVENTION

Data stored on a computer system typically requires periodic archival including deletion or movement to another storage device for a variety of reasons. Period archival may be any designated time duration. The criteria for this period management are often influenced by various factors including a company's data retention policies, end-user requirements, system capacity and performance.

In situations where a company controls or manages data on behalf of many other companies or organizations (e.g., government bodies, divisions, departments, different customers, or the like) identification of appropriate data objects and management of the archival of the data objects becomes problematic. Likewise, in a situation where a company has business reasons to segregate and manage data as separate and distinct objects, perhaps because of a diverse customer base for example, planning and executing a coherent archival policy that takes into account all of the different period archival and data object identification for the archival may become a significant challenge and complex.

Compounding this complexity may be requirements imposed by contractual arrangements or obligations which often occur due to business relationships or governmental policies. These requirements may be significantly different from one another. When a company is engaged in managing data on behalf of, or as a result of, such relationships or policies, the many different archival requirements may easily overwhelm a company that is obligated to perform regular archival. Tracking and assuring that compliance with all the different requirements is being met may become a daunting task.

Further, most archival programs today are typically developed, at additional cost, to address common functions inconsistently. That is, each archival program typically deals with identifying the set of data which is a candidate for archival, or deletion etc., according to its specific developed purpose, and deals with associated performance issues unilaterally without regard to any other archival program that may also be attempting to perform an archival function on a different set of data. This unilateral archival situation, which may involve many different archival programs, each typically targeted to a specific type or category of data, may strain computer system's throughput and performance and even impact primary non-archival applications' effectiveness or timeliness. Most of these programs have either coded management rules internally (making configuration costly) or developed proprietary means for configuration control.

SUMMARY OF THE INVENTION

In an aspect of the invention, a method is provided for controlling data. The method comprises the step of defining one or more data management rules associated with a data retention policy for one or more data objects, each of the one or more data management rules specifying an application program system associated with the one or more data objects, parameters for identifying the one or more data objects and a software module for performing archival management of the one or more data objects. The method further comprising the step of executing the software module when an event occurs, the event identifying at least one of the one or more data management rules to control the archival management based on the parameters and the specified application system for performing archival management operations on the one or more data objects identified by the one or more data management rules.

In another aspect of the invention, a method for controlling data management is provided. The method comprises the steps of instantiating a controller and providing an event name to the controller and accessing a rule associated with the event name. The method further comprises obtaining control data associated with a rule type associated with the rule and executing a program to perform archival functions on one or more data objects defined by the control data that includes at least a unit of work definition.

In another aspect of the invention, a system for managing data is provided. The system comprises a means for instantiating a controller and providing an event name to the controller and a means for obtaining control data associated with a rule type identified by the event name. The system further comprises a means for executing a program to perform archival functions on one or more data objects defined by the control data that includes at least a unit of work definition.

In another aspect of the invention, a computer program product is provided comprising a computer usable medium having readable program code embodied in the medium and includes at least one component to define one or more data management rules associated with a data retention policy for one or more data objects, wherein each of the one or more data management rules specify an application program system associated with the plurality of data objects, parameters for identifying the one or more data objects and a software module for performing archival management of the one or more data objects. At least one component is also provided to execute the software module when an event occurs, the event identifying at least one of the one or more data management rules to control the archival management based on the parameters and the specified application system.

DETAILED DESCRIPTION OF EMBODIMENTS OF THE INVENTION

This invention is generally directed to a system and method for providing highly configurable articulation of archival rule criteria and for a consistent process for executing programs which manage specific data using the articulated archival rule criteria. Data stored on computer media almost always has a shelf-life cycle and is typically not expected to be stored indefinitely. This shelf-life is often described by an organization's data retention policy statement or plan and is typically implemented by application systems in various ways. The system and method of the invention provides for a consistent process for achieving at least the following:

- capturing an organization's retention policy,
- defining how these policies may be applied to specific types of data,
- defining specific retention rules for defined data sets, and
- administering these rules in a variety of application systems.

Once these aspects of the invention have been implemented by an organization responsible for data management, ongoing consistent and reliable archival results may be achieved that is flexibly configurable to address a wide range of data types and system environments. This permits a higher degree of confidence that archival goals as defined by required policies or agreements by one or more policy setting organizations are being met.

Figure 1A:
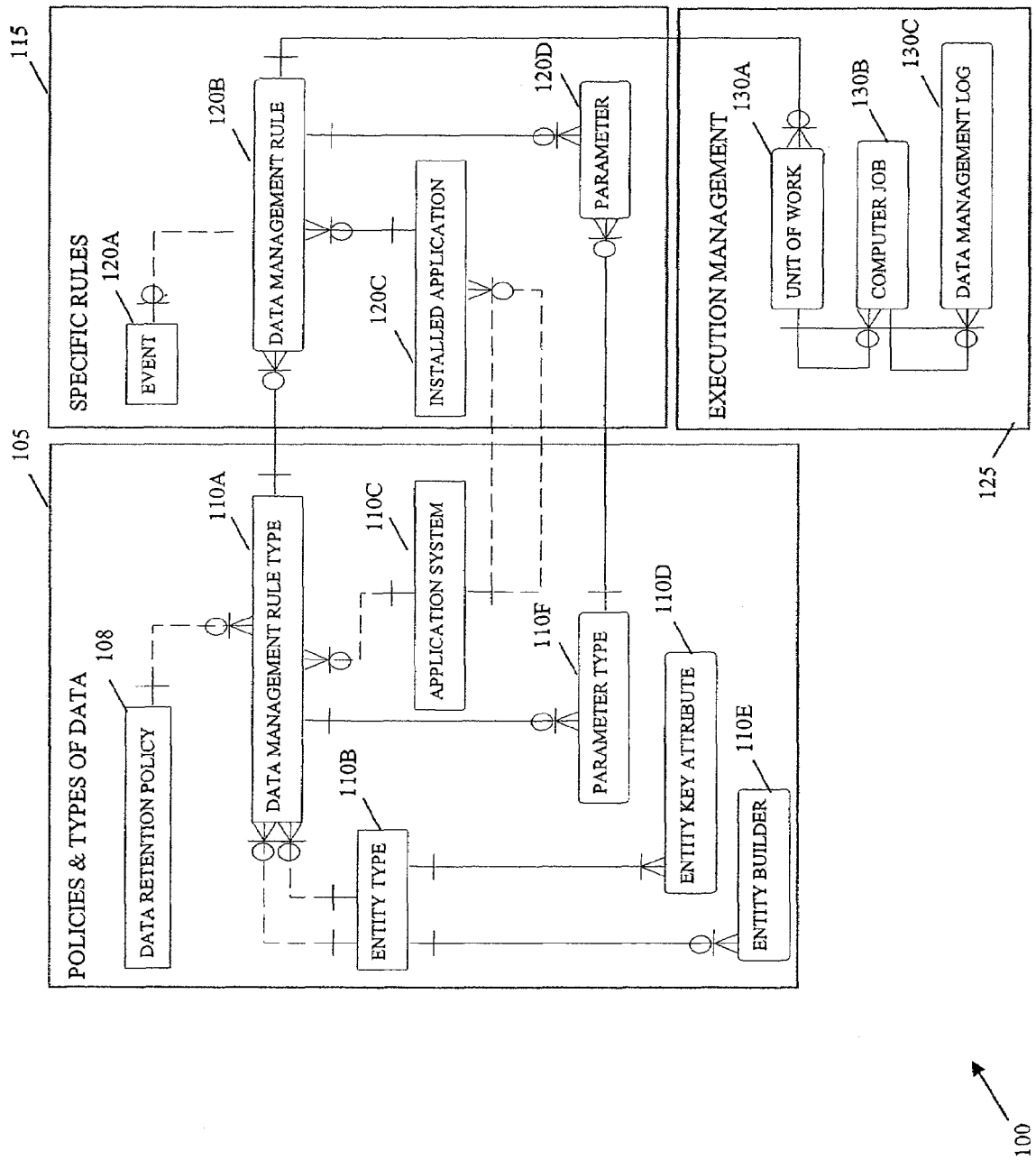
FIGS. 1A-1D are logical block diagrams illustrating various type of entities, provided, managed or used by the invention.
Figure 1B:
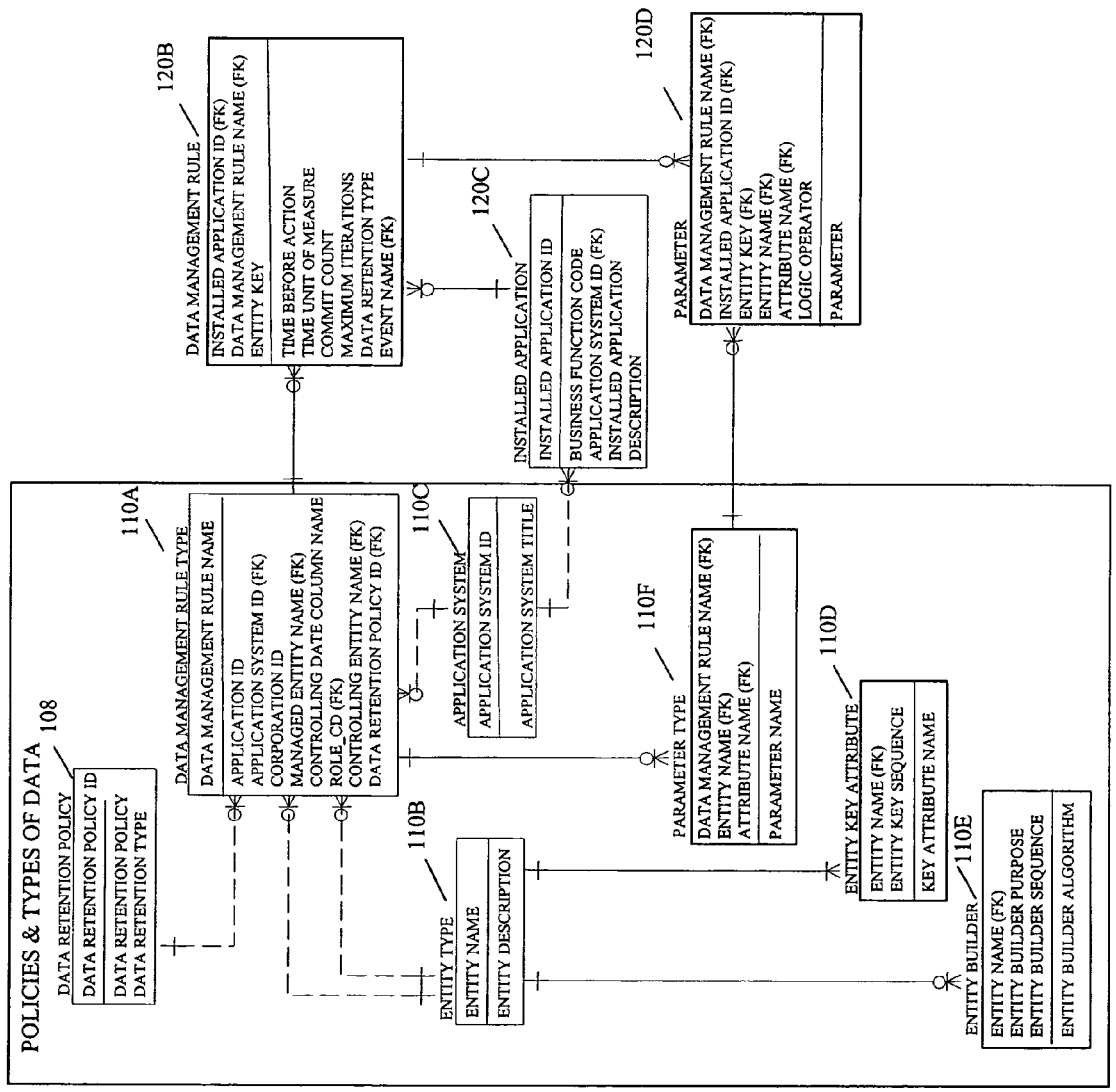
Figure 1C:
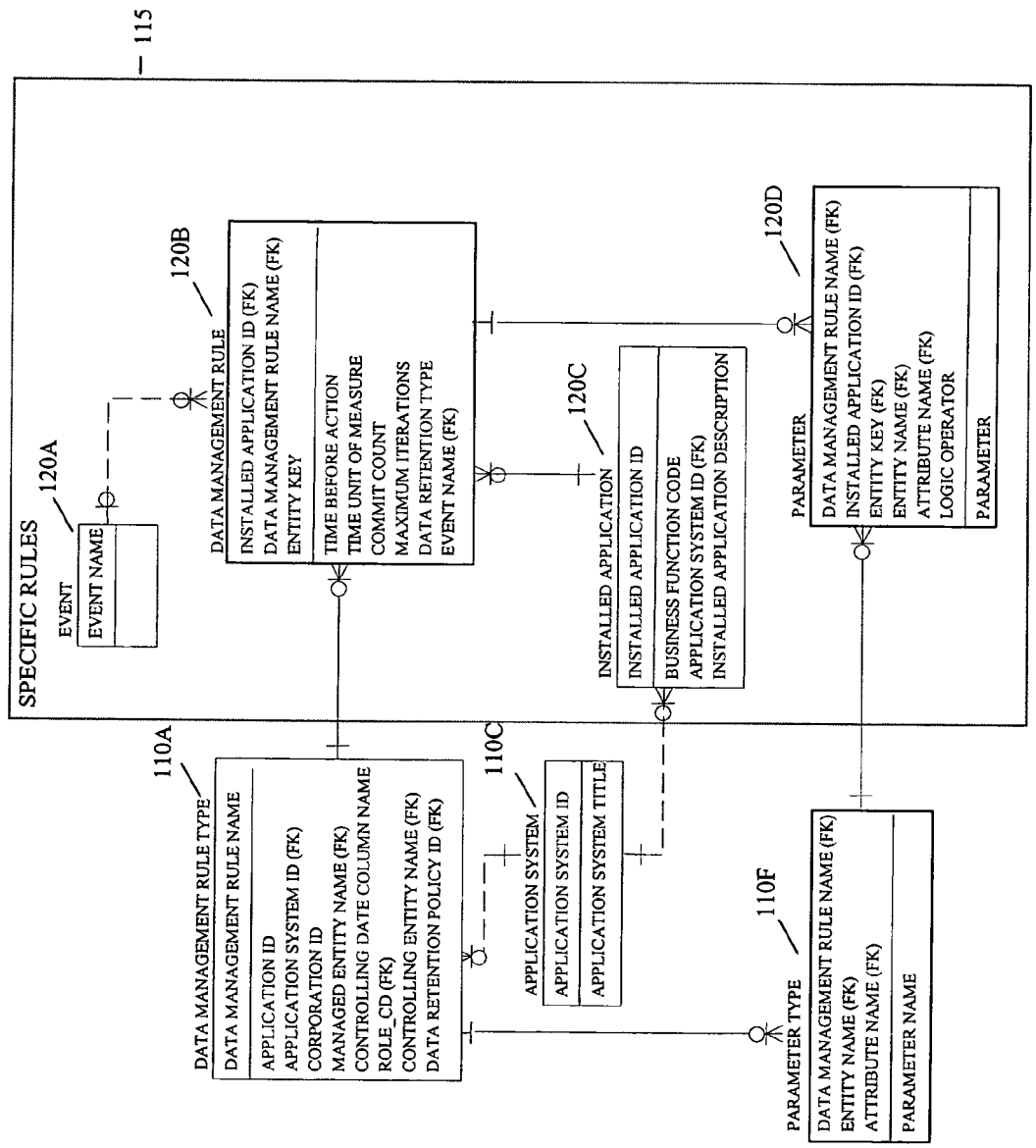
Figure 1D:
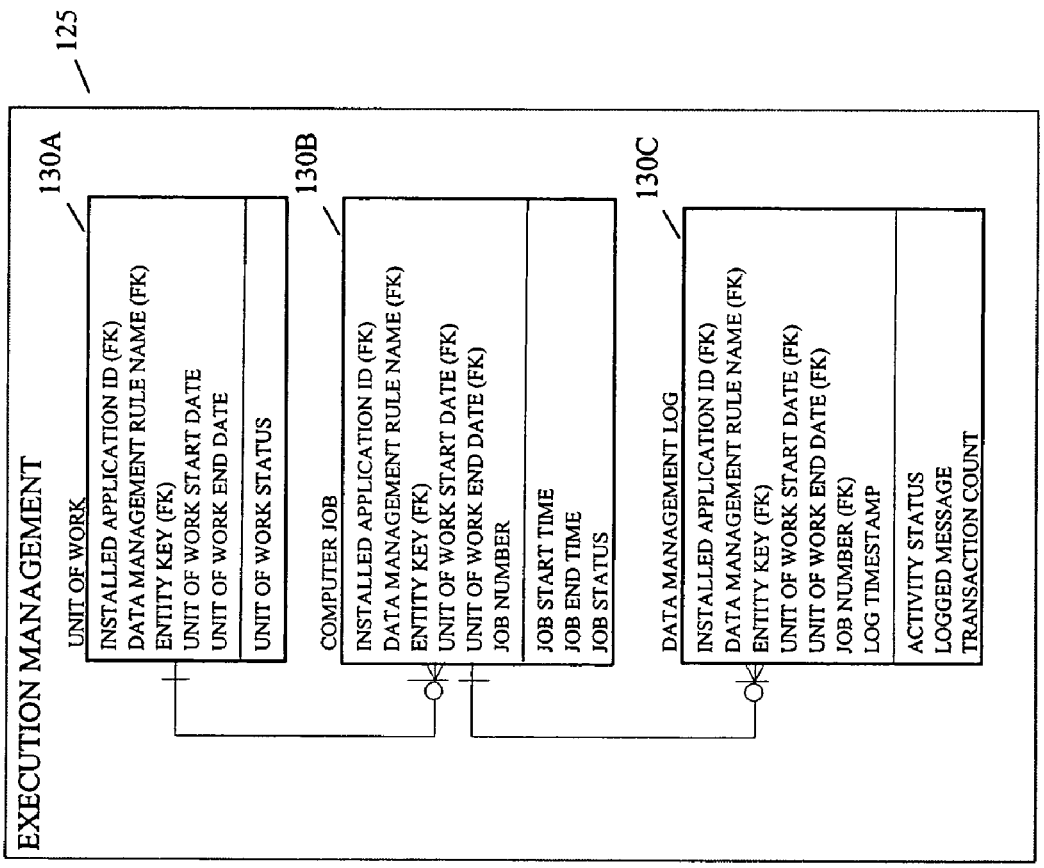

FIGS. 1A-1D are logical block diagrams illustrating various types of entities (data) provided, managed or used by the invention, generally denoted as reference numeral 100. FIG. 1A illustrates various entities on a higher level while FIGS. 1B-1D provide more detail of the entities and associated attributes. The logical entities for data management are shown organized into three general classifications: policies and rules for types of data 105, specific rules 115, and execution management 125. These entities may be defined and instantiated to achieve data management processing. Alternatively, FIGS. 1A-1D may also be steps for defining and/or creating the various entities shown.

The data retention policy 108 describes the retention policies of an organization where a retention policy may be required for each distinct organization. For example, Organization "A" may define data as requiring short, medium and long term storage, while Organization "B" may define data as disposable and essential. These definitions usually include an associated and/or specific "age". For example, "short term" may be defined as "store this data for six months", while "essential data" may be defined as "to be stored for seven years."

Data management rules type entities 110a-110f, collectively, is data which links the data retention policy 108 with specific entities found in application systems. By way of example, a data management rule type 110a may be "Supplier Entered Invoice" which may be managed by an application system 110c called "Web Payment Request" (WPR). This rule type describes the management of the "Supplier Invoice" entity type 110b and these invoices are identified by the Entity Key Attribute 110d, e.g., "Invoice Id". This rule type also defines the Entity Type 110b, i.e., the "controlling entity" used to define another level of granularity when stating a specific data management rule. The following further describes the various logical components and related attributes:

Entity Type 110b

This entity defines a person, place, thing, concept or event about which a business organization needs information in order to support its business activities. This entity can be uniquely identified by an Entity Type Name which is an attribute of Entity Type 110b and defines a unique name given to a type of entity such as EMPLOYEE, WORK LOCATION, ITEM, PURCHASE ORDER or PROCESS HISTORY, for example.

Entity Key Attribute 110d

This entity defines those attributes that compose a complete key or unique identifier, for an entity type. This information allows the system to automatically construct a variety in entity identifiers based on configuration and may have the following attributes:

Entity Type Name

This attribute defines the name of the entity type whose identifying attributes are being declared.

Entity Key Sequence Number

This attribute defines the order in which key attribute types are to be used to uniquely identify an instance of an entity type.

Key Attribute Type Name

This attribute defines the name given to those attribute types which make up the unique identifier of an entity type. The system uses this data to communicate with objects to obtain instances of entity identifiers dynamically. The following examples are for illustration of these attributes:

Entity Type "EMPLOYEE" (Entity Type Name) may be uniquely identified by attribute types "HR SYSTEM ID" and "EMPLOYEE ID", in that order; these are the Key Attribute Type Names with an Entity Key Sequence Number of 1 and 2, respectively.

Entity Type "COMPANY" may be uniquely identified by attribute types "COUNTRY CD" and "COMPANY CD", in that order.

Entity Type "COMPANY COMMODITY" may be uniquely identified by attribute types "COUNTRY CD", "COMPANY CD" and "COMM CD", in that order.

Entity Builder 110e

This entity may define a sequenced set of algorithms that may be invoked to accurately and completely construct a unique identifier when instantiating an entity type. These algorithms retrieve the data used to compose a unique key from an existing source thereby implementing a form of referential integrity. Referential integrity ensures that relationships between entities are complete and accurate. For example, the relationship "a COMPANY belongs to only one CORPORATION" is of "good integrity" only if the COMPANY refers to a CORPORATION that exists in a parent entity.

Data Management Rule Type 110a

This entity defines a named type of rule that describes a corporation's data retention policy for a single type of entity. This rule type governs the establishment of specific rules for the same Entity Type and may have one or more of the following attributes:

Data Management Rule Name

This attribute defines a name used to uniquely identify a rule type.

Application ID

This attribute defines a name that uniquely identifies a application program written in any program language that automates the actual data management action such as deleting, moving or summarizing a set of business data. A Data Management Rule Type is implemented by this program.

Application System ID

This attribute defines the name of a type of application system that operates on and stores business data that must be managed. There may be more than one instance of this type of application system. For example, CAAPS is the name given to a procurement system that has three instances running, one in Latin America, one in Europe and one in Asia Pacific. Each instance operates on and stores the same kind of business data and in the same format. A Data Management Rule Type is established for this application system having Application System ID.

Corporation ID

This attribute defines the name for a legal business entity that may be comprised of several smaller legal entities (i.e. companies). A Data Management Rule Type is defined by this corporation.

Managed Entity Type Name

This attribute defines that business data being managed by this Data Management Rule Type. For example, the entity type 'FINANCIAL INVOICE POSTING' may be the subject of a given rule type.

Controlling Entity Type Name

This attribute defines that Entity Type used to segment the business data and allow more specific policy requirements to be applied. For example, the business data policies in France may be different from those in the United States (i.e., Entity Type "COUNTRY"). This attribute may be used when configuring specific Data Management Rules to govern what entity may be selected for the rule.

Controlling Column Name

This attribute defines the name of the date or timestamp data that exists within the business data (named via the Managed Entity Type Name) to be used to determine eligibility for some action (e.g., delete, summarize, etc.).

Role CD

This attribute defines the role a person must be assigned in order to change the configuration of the specific rules created for this rule type.

Application System 110c

This entity defines the type of application system that "owns" the data that is to be managed according to company policy.

Parameter Type 110f

This entity defines, if necessary, the types of parameters the "archiver" (a program for performing archival functions) application requires to establish eligibility of a business document (e.g. transaction) for data management action.

Still referring to FIGS. 1A-1D, Specific Rules 115, are components, collectively, which describe specific data management rules for controlling entities. For example, a "Business Unit" (e.g. "Company-A General Procurement" or "Company-B Personal Systems Division") may be an example of a controlling entity. A controlling entity might be at a higher level, such as "North America" (a geographical region), or an entirely different entity like "CAAPS63103" which may be a specific installation of an Enterprise Resource Planning-ERP system). The components of Specific Rules 115 may include the following entities:

Event 120a

This entity defines a named event such as a time triggered event or the completion of another computer job.

Data Management Rule 120b

This entity defines an instance of a Data Management Rule Type 110a that is used during execution to identify eligible business documents to be archived or purged, etc. This entity includes control attributes such as the specific application instance that houses the data being ménage, the number of days (or other time period) that must pass, relative to a date or timestamp on the business document involved, before action is to be taken, the unit of measure of this "time before action" attribute, the maximum number of documents to be processed within a unit of work (i.e., before the actions are committed to a database), or the maximum number of times eligible documents may be sought within a single execution of the rule.

Installed Application 120c

This entity defines the specific instance of an application system that "owns" the data that is being managed. For example, installed application IBMSAPGP0 and IBMSAPGP1 are two instances of the application system (type) "SAP."

Parameter 120d

This entity defines a specific tagged piece of data used by the "archiver" to determine the eligibility of a business document regarding data management.

Still referring to FIGS. 1A-1D, the Execution Management 125, collectively, is data that enables the administration of the defined rules. This allows a central controlling component to track the status and completeness of the specific units of work. The following describes components of Execution Management 125 in more detail:

Unit of Work 130a

This entity defines a set of business documents that may be eligible for data management action. This set of documents may be identified by, among other things, the age of the documents.

Computer Job 130b—This entity defines a single, identifiable execution of a program or group of programs.

Data Management Log 130c

This entity defines a database for logging or audit purposes.

Figure 2:
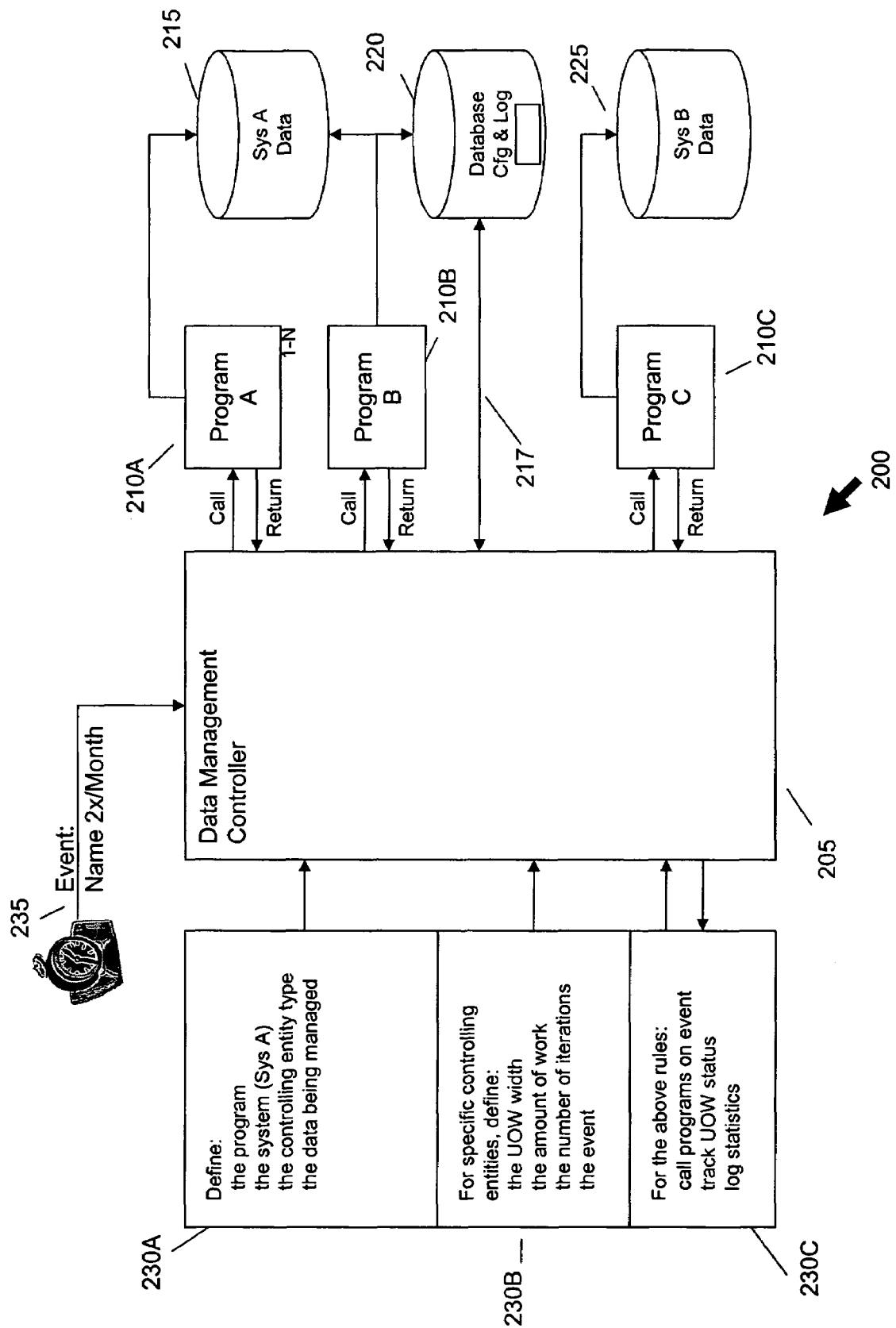
FIG. 2 is a functional block diagram of an embodiment of the invention.

FIG. 2 is a functional block diagram of an embodiment of the invention, generally denoted by reference numeral 200. This embodiment includes a data management controller (DMC) 205, one or more "black box" programs 210a-210c (of which there may be multiple iterations, 1-N, of these programs) and a database 215 having data (e.g., invoice data, financial data, corporate data and/or resume data, or the like) requiring archival processing, perhaps associated with a particular system, such as "System A." Also included is a database 220 for configuration and logging and a database 225 having other data requiring archival which may be associated with another particular system, such as "System B."

The DMC 205 may be responsible for one or more activities including the following:
   i) Finding specific data management rules associated with the named event which triggered the process.
   ii) Determining the "unit of work" ("UOW width" is the start and end date range age of the data to be processed).
   iii) Calling the "archiver" programs and passing the maximum number of transactions or 'objects' to be acted upon at this time (amount of work), the UOW dates and any parameters which further qualifies the data to be processed.
   iv) Calling the "archiver" programs again if the amount of work exceeded the maximum according to the number of iterations defined.
   v) Tracking the status of each UOW.
   vi) Logging general statistics about the "computer job" (e.g. duration, run history).

Continuing with FIG. 2, the functional components 230a-230c illustrates these and other functional steps that the DMC 205 performs, which may be accomplished by various software routines. For example, functional block 230a shows that the DMC defines and/or identifies one or more program(s) (e.g., 215, 220 or 225), the system (e.g., Sys A), the controlling entity, and the data being managed. Function block 230b illustrates that for specific controlling entities, the DMC 205 identifies or defines the unit of work width (UOW), the amount of work, the number of iterations and the event for launching archival processing. Function block 230c shows exemplary action that may be taken by the DMC 205, including calling appropriate "archiver" programs (e.g., 210a-210a) triggered by a particular event (such as event 235), tracking UOW status, and log statistics. The event 235 may occur on a predetermined frequency such as twice a month, for example.

This embodiment, 200, also illustrates that "archiver" Program A, 210a, may be used for archival processing of data associated with Program A, such as, for example, invoice data, which may reside on database 215. Program B, 210b, is illustratively shown to process associated data, which may be resume data as an example, and which is also resident on database 215. However, in one embodiment, Program B, 210b, may also log activity directly to database 220. In other embodiments, the DMC 205 may perform the logging function instead of the "archiver" program, as denoted by reference numeral 217. For example, Program C 210c, may process data associated with System B as represented by reference numeral 225, and defers to the DMC 205 to log on its behalf to database 220, as denoted by reference numeral 217.

In general, the "archiver" programs has the following responsibilities, for example:

i) Acting on the data for which the program is written based on the UOW dates, the criteria passed as parameters and limited to the amount of work (e.g., number of transactions) passed.

ii) Logging business control counts (i.e., Data Management Log) for audit purposes.

As should be understood, though, "archiver" programs may include additional responsibilities.

To coordinate the activities of the system, a common archival framework and implementation of the data management architecture (an example prototype of which is presented below in reference to Tables 1, 2 and 3) typically includes the following basic rules:

i) "Archiver" applications should implement the Archiver Interface (as illustrated below). There is typically one method defined in this interface, called by the DMC when a rule is invoked.

ii) "Archiver" applications communicate back to Controller via an instance of the ResultData (Definitions below) Class.

iii) "Archiver" applications can obtain configuration information by implementing the Parameters Interface (Definitions below).

iv) All "archiver" applications should register with the Controller via the archivers.xml file. An entry exists for each "archiver" application. This file also provides the controller with the class names for any implementations of the parameters interface.

v) The controller checks (per rule) to see if a previous Unit of Work (hereafter referred to as UOW) is incomplete. If an incomplete UOW exists then it may be marked as completed and a new one may be created with the same date range as the previous run.

vi) The controller calls the implementation of the Parameter Interface as defined in the archivers.xml file so that it can gather any additional data needed by the "archiver" applications.

vii) The controller calls the "performArchival" method of an associated "archiver" application which then performs the archival action.

viii) The ResultData object returned back from the "archiver" may be queried for a status from the "archiver." If an unsuccessful status is returned the "archiver" applications are called for the number of iterations as configured in the rule table.

ix) If a successful status is obtained the UOW may be marked as completed.

An example of an Archiver interface is shown in Table 1. This interface may implemented by all "archiver" applications. In this example, the DMC passes control via the "performArchival" method to the "archiver" application that handles the particular rule being processed.

TABLE 1

```
package com.ibm.pes.bridges.commonarchival.core;
import com.ibm.pes.bridges.core.config.BridgeContext;
public interface Archiver {
    public ResultData performArchival(Parameters param, BridgeContext
    sess);
}
```

Table 2 is an example of a "ResultData" Class for that may be used for messaging between the "archiver" applications and the DMC.

TABLE 2

```
package com.ibm.pes.bridges.commonarchival.core;
import java.io.Serializable;
import java.util.List;
public class ResultData implements Serializable {
    private boolean successful;
    private List results;
    /***************************
     * Return a true only if the number of records
     * processed is < the commit count.
     * return false in every other case or if an
     * exception occurs.
     ***************************/
    public boolean isSuccessful( ) {
        return successful;
    }
    public void setSuccessful(boolean val) {
        successful = val;
    }
    /***************************
     * Return an object of type ExecutionResult that
     * contains messages
     *
     ***************************/
    public ExecutionResult getExecutionResult(int i) {
        return (ExecutionResult) results.get(i);
    }
}
```

In this example, all "archiver" programs may return an object of this type and minimally set a status indicating whether the program successfully performed the archival for all the data. This class may also provide the ability to return an object of type "ExecutionResult" that may be used for enhanced logging and messaging. In embodiments, using this object logging may be done by the DMC itself.

Table 3 is an example of a parameters interface for passing configurations to the "archiver" applications.

TABLE 3

```
package com.ibm.pes.bridges.commonarchival.core;
import com.ibm.pes.domain.DataManagementRule;
/**
 * @author jhingann
 *
```

TABLE 3-continued

```
* This interface defines the parameters that need to
* be passed to an implementation of the Archiver.
*/
public interface Parameters {|
    public abstract void addParameter(Object paramName, Object
    paramValue);
    public abstract String getParameterAsString(Object paramName);
    public abstract Object getParameter(Object paramName);
    public void doInit(DataManagementRule dmr);
}
```

This exemplary interface may be employed to pass configuration to the "archiver" applications. A default implementation is also provided that may pass the installed application id, Entity, Commit Count and relevant dates. "Archiver" applications may also implement this interface to also pass other "config" data, with appropriate changes, as necessary.

Figure 3:
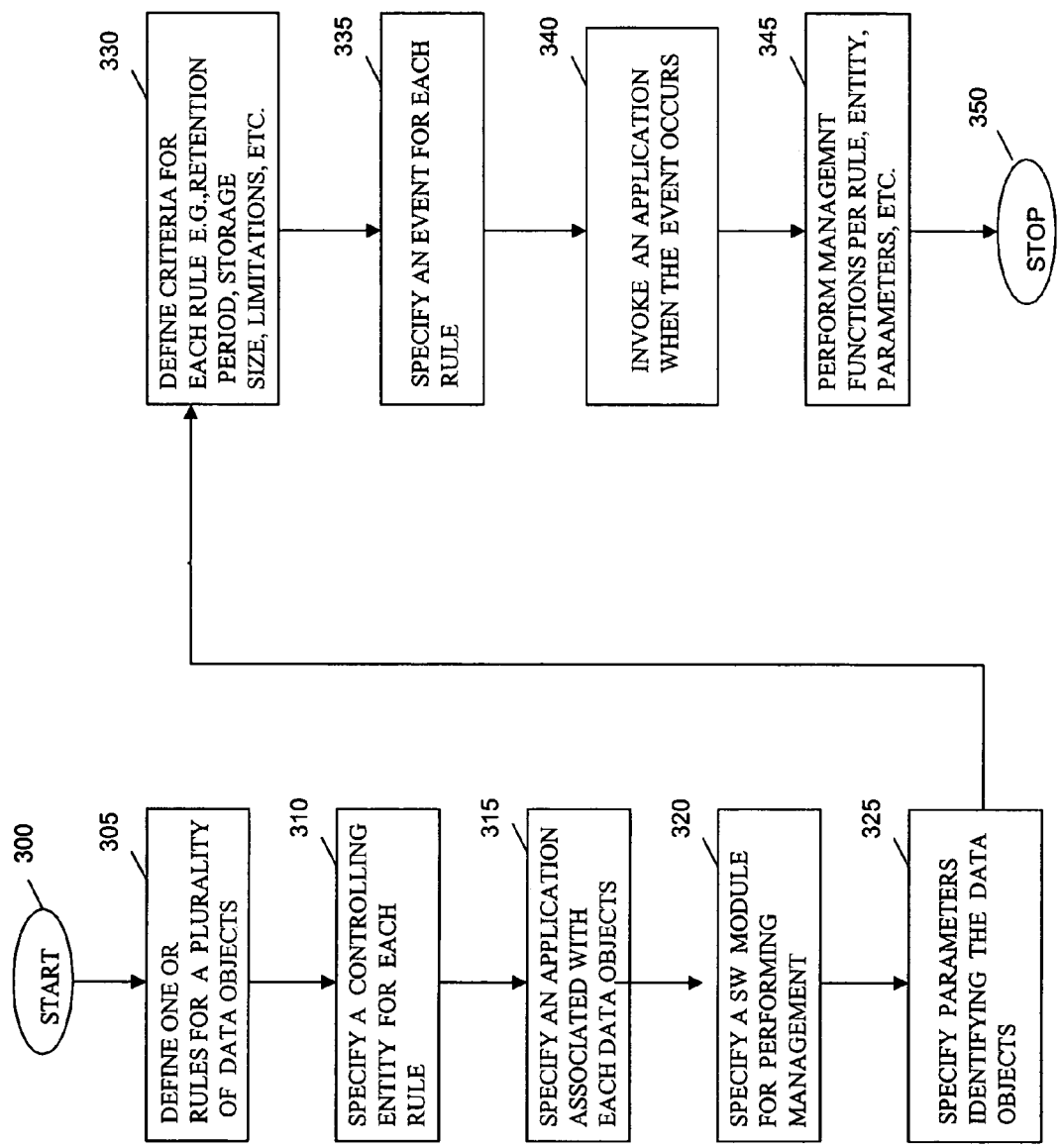
FIG. 3 is a flow diagram of an embodiment of the invention showing steps of using the invention.

FIG. 3 is a flow diagram of an embodiment of the invention showing steps of using the invention, starting at step 300. FIGS. 3 and 4A-4C may equally represent a high-level block diagram of components of the invention implementing the steps thereof. The steps of FIGS. 3 and 4A-4C may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Continuing with FIG. 3, at step 305, one or more rules may be defined for a plurality of data objects. At step 310, a controlling entity may be specified for each rule. At step 315, an application may be specified and associated with each data object. At step 320, a software module may be specified for performing management functions such as archival, moving the data objects to another storage system, or the like. At step 325, parameters may be specified that more precisely identifies the data objects that are eligible to be acted upon. For example, a list of status codes may be enumerated that indicate that a financial document is "ready to be purged."

At step 330, a criterion or criteria may be defined for each rule such as, for example, retention period, storage size, or other limitations in processing. At step 335, an event may be specifies for each rule. At step 340, an application (e.g., an "archiver") may be invoked when the event occurs. At step 345, archival management functions such as moving data, deleting data, and/or storing data on a new storage facility may be executed per the rule and associated entities using parameters defined for the rule and rule types. The process ends at step 350.

Figure 4A:
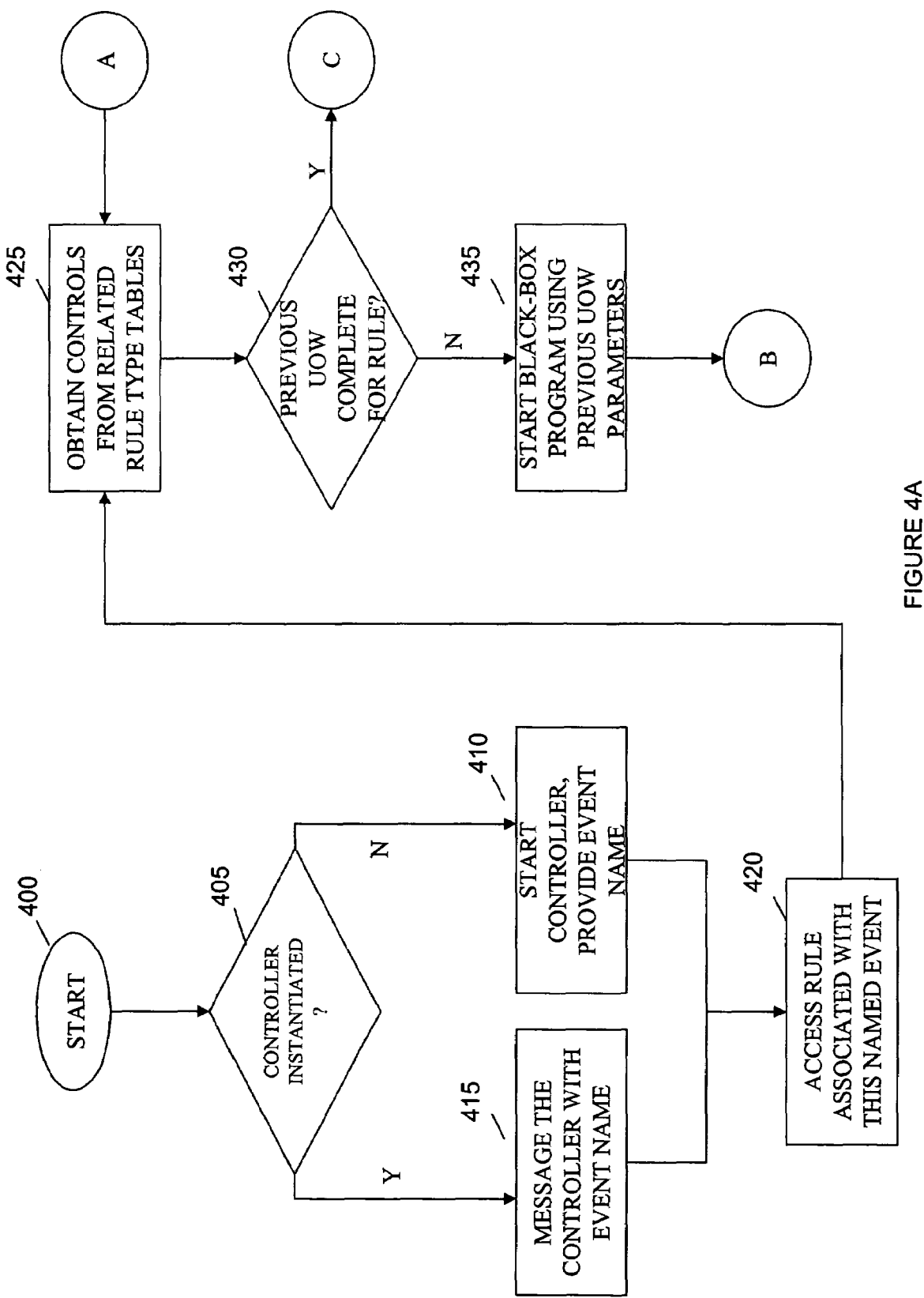
FIGS. 4A-4C are flow diagrams of an embodiment showing steps of using the invention.
Figure 4B:
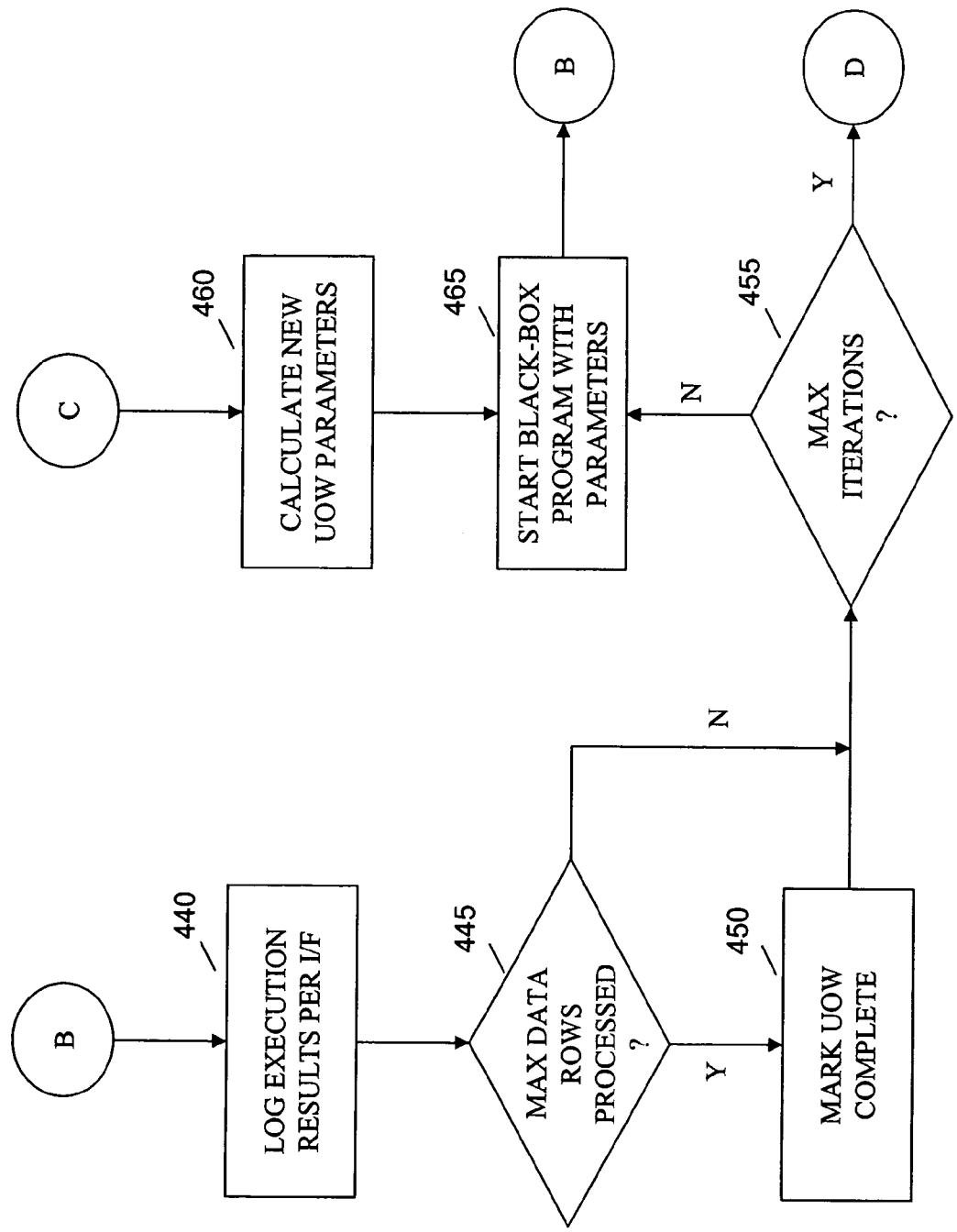
Figure 4C:
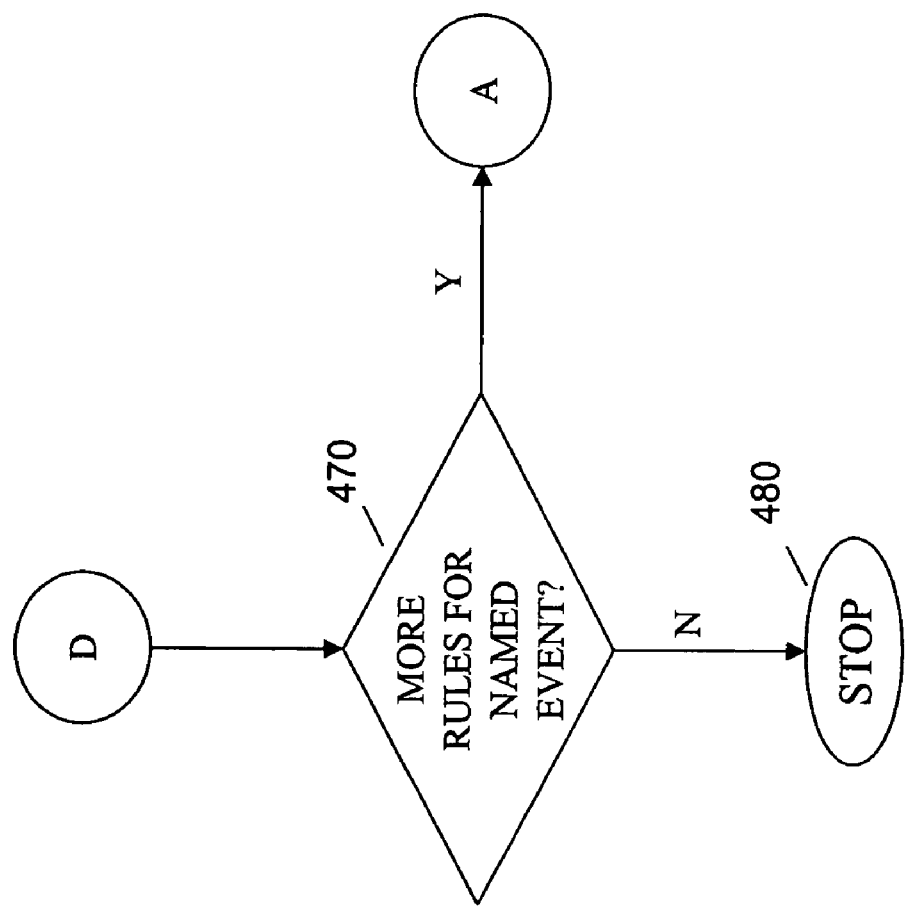

FIGS. 4A-4C are flow diagrams of an embodiment showing steps of using the invention, starting at step 400. At step 405, a check is made whether a controller has been instantiated. If yes, then at step 415, a message is provided to the controller with an event name which initiates archival or data retention processes. Processing continues with step 420. If, however, the controller is not instantiated, then at step 410, the controller is started and is provided an event name to initiate archival or data retention processing. At step 420, a rule associated with the named event is accessed. At step 425, controls from related rule type tables are obtained for the rule.

At step 430, a check is made whether a previous unit of work (UOW) has completed for the rule. If completed, then at step 460, new UOW parameters may be calculated, as appropriate for remaining data. At step 465, the appropriate "archiver" program associated with the rule is started with the new parameters. If, however, at step 430, a previous UOW has not completed, then at step 435, an appropriate "archiver" program is started for the rule using previous UOW parameters. At step 440, a log entry may be entered to log execution results per the interface parameters from the "archiver". At step 445, a check is made whether a maximum amount of data or rows of data (i.e., the maximum number of business documents to be processed) have been processed. If yes, then at step 450, the UOW is marked as "complete" and processing continues with step 455. If no, then processing continues at step 455.

At step 455, a check is made if the maximum iterations have been made for the current named event. If not, then at step 465, the "archiver" program is started with parameters (e.g., UOW parameters, maximum documents to process, etc.) for this iteration and the process continues with step 440. If however, the maximum number of iterations has been achieved, then at step 470, a check is made to see if any more rules exist for the named event. If so, then processing resumes using the new rule at step 425. Otherwise, if no additional rules for the named event, then the process stops at step 480.

EXAMPLE OF USE

As an illustrative example, assume the following scenario: HALCO is composed of 32 different companies throughout the world. Three of these companies use two instances of the "CAAPS" system to handle accounts payable transactions (paying supplier invoices) in the U.S. and Germany. These two systems, "CAAPSUS" and "CAAPSDE", need the transactional data moved from the production system to an archive database 20 days after the payments have been cleared. The archive database is referred to as the "APBDW" data warehouse system. These payment documents must be deleted from the "APBDW" system two years after the payments were archived for the U.S. company and three years for the Germany company. The definition of "cleared" may be slightly different between the two countries; this difference is represented as two intersecting sets of status codes found on the documents.

A Global Administrator in their corporate role may establish Rule Types as follows:
  i) The logical Entity CAAPS_COMPANY is defined to the system as having a two party key of Country_Code and Company_Code.
  ii) The entity "build" logic is created that first identifies a subset of Country_Codes from a AP.TCOMPANY_TBL DB2 table by joining that table with a system interface control table that associates companies with installed application systems. This relation includes only "CAAPS" installations. The second portion of the build logic provides the list of companies within a specified country (as typically provided by an end user) for companies that use the "CAAPS" installations.
    a. The result of the first build logic is a relational data set:
      1. US—United States of America
      2. DE—Germany
    b. The result of the second build logic is the set:
      1. US—CO01—US Commercial Division
      2. DE—CO02—German Commercial Division
      3. DE—CO03—German Residential Division iii) Two Data Management Rule Types may be created for these illustrative three companies that indicate:
  a. For the archive action:
    1. The rule type name (e.g. 'CAAPS_PAYMENTS_ARCHIVE').
    2. The program that will handle the archive (e.g. "CP134A100").
    3. The fact that this is a "CAAPS" system rule.
    4. The fact that this rule is for companies of the HALCO Corporation.
    5. The fact that the "PAYMENT" document is being managed.
    6. The use of the CAAPS_COMPANY as the controlling entity.
    7. The role an administrator must have to create and maintain the actual rules (e.g. Country Admin).
  b. For the deletion action:
    1. The rule type name (e.g. "CAAPS_PAYMENT_PURGE").
    2. The program that will handle the purge (e.g. "PAY-PURGE").
    3. The fact that this is a "APBDW" system rule.
    4. The fact that this rule is for companies of the HALCO Corporation.
    5. The fact that the "PAYMENT" document is being managed.
    6. The use of the CAAPS_COMPANY as the controlling entity.
    7. The role an administrator must have to create and maintain the actual rules (e.g., "Country Admin"). The Role of "Country Admin" implies that an administrator may define rules for only those companies within authorized country(s).
iv) A single Parameter Type may be defined to allow country administrators to describe the status codes representing a "cleared" payment. The Parameter Type "PAY_ST_CD" is created for the DB2 table "AP.TPAY_HDR" that houses the Payment document "header" for the "CAAPS_PAYMENT_ARCHIVE" rule type.

The Country Administrator may now create as many specific rules as are needed for the companies within the Country Administrator's span of control. For example, the administrator may select the installed application system for which the rule is being created based on the application system specified in the rule type, then selects the countries and companies to which the rule applies (the Entity Build logic dynamically creates the valid set of countries and companies). For the "CAAPS_PAYMENT_ARCHIVE" and "CAAPS_PAYMENT_PURGE" rule types there are three rules:

CAAPS_PAYMENT_ARCHIVE
1. "CAAPS_PAYMENT_ARCHIVE" on the "CAAPSUS" system for the US Commercial Division (US-CO01).
  i) Time before action: 20
  ii) Unit of Measure: Days
  iii) Commit Count: 5,000 (Every 5,000 documents, commit the work to the database to allow greater concurrent access. If the program encounters fewer eligible documents the commit is performed and the Unit of Work is complete.)
  iv) Maximum number of Iteration: 4 (Allow up to 4 sets of 5,000 documents to be archived.)
  v) Data Retention Type: "Essential" (This company allows for two classifications of data. Essential data must be kept for a much longer period than Disposable data. This is typically documentation only.)
  vi) Event Name: "2x/Month" (This name implies that the rule and associated program is filed twice a month. It is up to the scheduling software to implement the specific schedule and pass this name when appropriate.)
  vii) Frequency SQL Logic: not applicable in this example.
2. "CAAPS_PAYMENT_ARCHIVE" on the "CAAPSUS" system for the German Commercial Division (DE-CO02).
  i) Time before action: 20
  ii) Unit of Measure: Days
  iii) Commit Count: 2,000
  iv) Maximum number of Iteration: 10
  v) Data Retention Type: "Essential"
  vi) Event Name: "Weekly"
3. "CAAPS_PAYMENT_ARCHIVE" on the "CAAPSUS" system for the German Residential Division (DE-CO03).
  i) Time before action: 20
  ii) Unit of Measure: Days
  iii) Commit Count: 1,000 (this company has fewer documents)
  iv) Maximum number of Iteration: 5
  v) Data Retention Type: "Essential"
  vi) Event Name: "Weekly"

CAAPS_PAYMENT_PURGE
1. "CAAPS_PAYMENT_PURGE" on the "APBDW" system for the US Commercial Division (US-CO01).
  i) Time before action: 2
  ii) Unit of Measure: Years
  iii) Commit Count: 10,000
  iv) Maximum number of Iteration: 20
  v) Data Retention Type: "Essential"
  vi) Event Name: "Monthly"
2. "CAAPS_PAYMENT_PURGE" on the "APBDW" system for the German Commercial Division (DE-CO02).
  i) Time before action: 2
  ii) Unit of Measure: Years
  iii) Commit Count: 10,000
  iv) Maximum number of Iteration: 20
  v) Data Retention Type: "Essential"
  vi) Event Name: "Monthly"
3. "CAAPS_PAYMENT_PURGE" on the "APBDW" system for the German Residential Division (DE-CO03).
  i) Time before action: 2
  ii) Unit of Measure: Years
  iii) Commit Count: 10,000
  iv) Maximum number of Iteration: 20
  v) Data Retention Type: "Essential"
  vi) Event Name: "Monthly"

Additionally, for each defined rule, the parameters which distinguish "cleared" payments may be created for the PAY_ST_CD defined for the rule type. For the "CAAPS_PAYMENT_ARCHIVE" US rules the parameter list may be "CL" and "PS" and for Germany the list may be "CL", "BL" and "AC". These variables are used by the "archiver" archive and purge programs to further describe the set of business documents (e.g., the payments) that are eligible to be purge. The only payment documents that should be purged are those that have "cleared"; this list of status codes provides definition of "cleared" to the archiver program.

While the invention has been described in terms of embodiments, those skilled in the art will recognize that the invention can be practiced with modifications and in the spirit and scope of the appended claims.

What is claimed is:
1. A method of controlling data, comprising the steps of:
  defining one or more data management rules associated with a data retention policy for one or more data objects, each of the one or more data management rules specifying an application system associated with the one or more data objects, parameters identifying the one or more data objects and a software module performing archival management of the one or more data objects, the one or more data management rules defined by a criteria, which is passed as other parameters and comprises processing limitations, the processing limitations configured to include a retention period or a storage size, the parameters defining an instance of a parameter type, which specifies a data management rule name associated with the one or more data management rules, an entity name, and an attribute name;

executing the software module, which is configured to perform the archival management and move the one or more data objects to another storage system when an event occurs during at least one of a time triggered event or a completion of a computer job, the event identifying at least one of the one or more data management rules to control the archival management based on the parameters and the specified application system for performing archival management operations on the one or more data objects identified by the one or more data management rules; and defining one or more data management rule types associated with the data retention policy, the one or more data management rules each define an instance of the data management rule types, wherein the one or more data rule types specify a named type of rule that describes a data retention policy for an entity type, and the one or more data rule types have the following attributes controlling the archival management:
i) an application ID,
ii) an application system ID,
iii) a corporation ID,
iv) a managed entity name,
v) controlling entity name,
vi) a role CD,
vii) controlling date column ID, and
viii) a data retention policy ID.

2. The method of claim 1, wherein the entity type defines a person, place, thing, concept or event which is uniquely identified and has at least one of a name attribute and description attribute and has associated an entity key attribute which defines attributes that compose a complete key for the entity type.

3. The method of claim 1, further comprising the step of defining and associating with the one or more data management rules the following attributes for use in controlling the archival management:
i) an installed application ID,
ii) an entity key,
iii) a time before action,
iv) a time unit of measure,
v) a commit count,
vi) a maximum iterations,
vii) a data retention type, and
viii) an event name.

4. The method of claim 3, wherein the one of more data management rules is associated with an installed application entity having an installed application ID and at least any one of a business function code, an application system ID and an installed application description.

5. The method of claim 1, further comprising defining one or more entity types which identify the one or more data objects and has attributes including an entity name an entity description and an entity key attribute.

6. The method of claim 5, wherein the entity key attribute has attributes including an entity name, and entity key sequence, and a key attribute name.

7. The method of claim 5, further comprising defining one or more entity builders that each define a sequenced set of algorithms that constructs a unique identifier when invoked by instantiating one of the one or more entity types.

8. The method of claim 1, further comprising defining a unit of work entity having one or more attributes including one or more computer job entities.

9. The method of claim 8, further comprising defining one or more attributes of the unit of work entity including at least any one of an installed application ID, a data management rule name, an entity key, a unit of work start date, a unit of work end date, and a unit of work status for controlling the archival management of at least one of the one or more data objects identified by the entity key.

10. The method of claim 8, further comprising associating one or more data management log entities with the one or more computer job entities for logging activity of the archival management when executed, the one or more data management log entities having attributes including at least any one of an installed application ID, data management rule name, an entity key, a unit of work start date, a unit of work end date, a job number, a log timestamp, an activity status and a logged message, a transaction count.

11. The method of claim 1, wherein the event occurs periodically to initiate the executing step and provides an event name to the one or more data management rules.

12. A computer program code stored on storage media, the computer program code includes at least one component to:
define one or more data management rules associated with a data retention policy for one or more data objects, wherein each of the one or more data management rules specify an application system associated with the one or more data objects, parameters identifying the one or more data objects and a software module performing archival management of the one or more data objects. the one or more data management rules defined by a criteria, which is passed as other parameters and comprises processing limitations, the processing limitations configured to include a retention period or a storage size, the parameters defining an instance of a parameter type, which specifies a data management rule name associated with the one or more data management rules, an entity name, and an attribute name;

execute the software module, which is configured to perform the archival management and move the one or more data objects to another storage system when an event occurs during at least one of a time triggered event or a completion of a computer job, the event identifying at least one of the one or more data management rules to control the archival management based on the parameters and the specified application system; and define one or more data management rule types associated with the data retention policy, the one or more data management rules each define an instance of the data management rule types, wherein the one or more data rule types specify a named type of rule that describes a data retention policy for an entity type, and the one or more data rule types have the following attributes controlling the archival management:
i) an application ID,
ii) an application system ID, iii) a corporation ID, iv) a managed entity name, v) controlling entity name, vi) a role CD, vii) controlling date column ID, and viii) a data retention policy ID.

13. The method of claim 1, wherein the performing archival management further comprises passing a maximum iteration to an archiver and calling the archiver again if an amount of work exceeds the maximum iteration.

14. The method of claim 12, wherein the one or more data management rules are administered via an execution management system comprising a unit of work, a computer job, and a data management log.

15. The method of claim 14, further comprising a controlling component configured to track the status and completeness of the unit of work.

16. The method of claim 1, wherein the one or more data management rules are configured to identify the one or more data objects to be archived or purged.

* * * * *